United States Patent

[11] 3,592,128

| [72] | Inventor | Alfred W. French<br>Piqua, Ohio |
|---|---|---|
| [21] | Appl. No. | 735,050 |
| [22] | Filed | June 6, 1968 |
| [45] | Patented | July 13, 1971 |
| [73] | Assignee | The French Oil Mill Machinery Company<br>Piqua, Ohio |

[54] SCREW PRESS
12 Claims, 16 Drawing Figs.

[52] U.S. Cl. .................................................. 100/145,
100/150, 241/300
[51] Int. Cl. .................................................. B30b 3/00,
B30b 3/02
[50] Field of Search ........................................... 100/117,
145, 146, 147, 148, 149, 150; 241/245, 246, 298,
300; 259/178

[56] References Cited
UNITED STATES PATENTS

| 2,397,305 | 3/1946 | Wheat ........................ | 100/145 UX |
| 3,002,446 | 10/1961 | Jung ........................... | 100/145 |
| 3,326,480 | 6/1967 | Jones .......................... | 241/300 X |
| 3,367,585 | 2/1968 | Ratkowski ................... | 241/300 X |
| 3,469,824 | 9/1969 | Futty et al. ................... | 259/178 |

Primary Examiner—Peter Feldman
Attorney—Marechal, Biebel, French and Bugg

ABSTRACT: A screw press has a cage defining an elongated pressing chamber, a screw extends within the chamber and has a plurality of worm bodies supporting a series of axially spaced helical flights receiving stationary breaker bars therebetween, and the flights have a hardened insert member removably connected to the corresponding body for resistance to wear and convenient reconditioning of the screw.

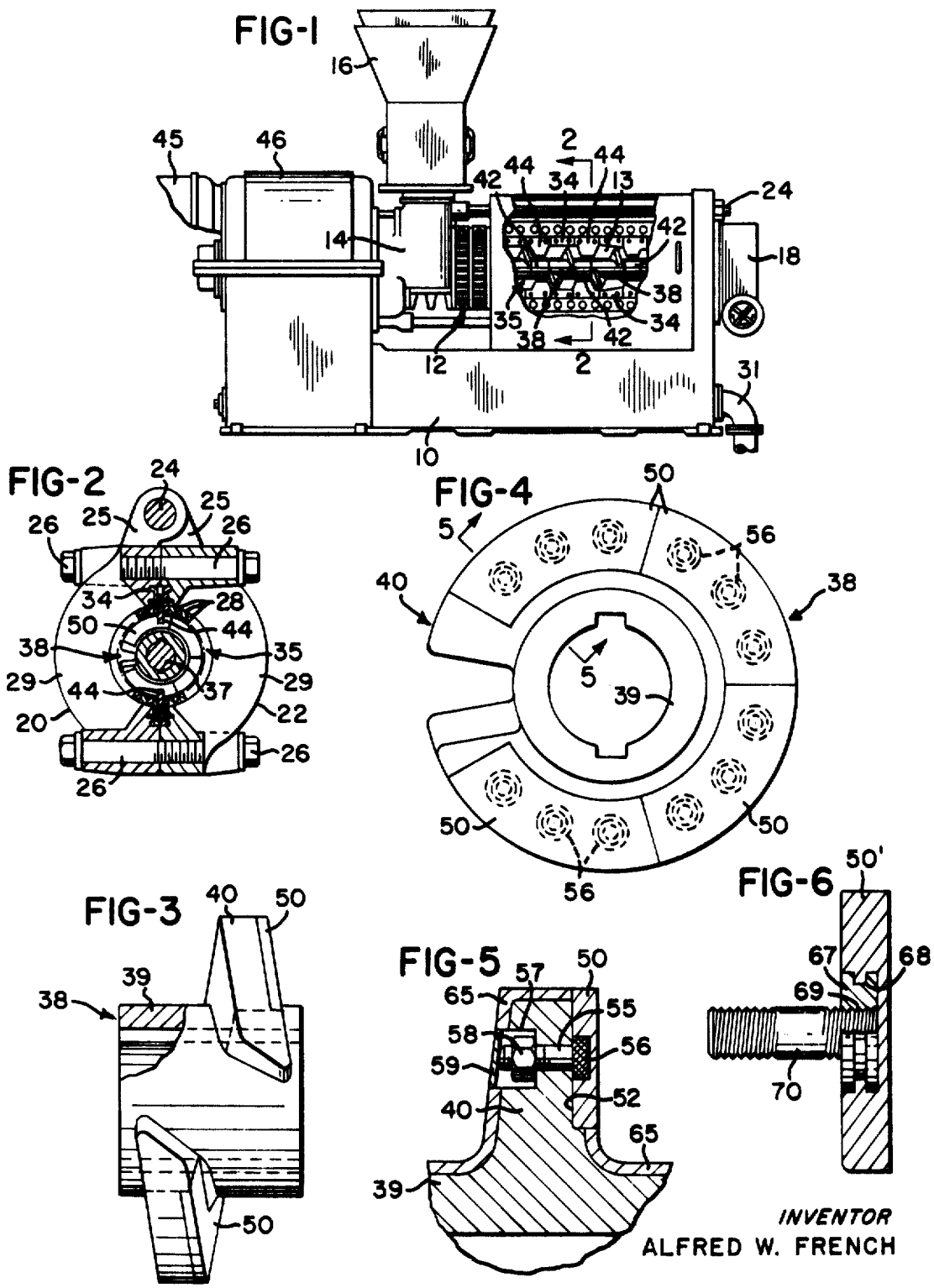

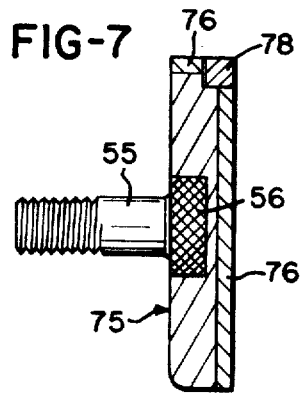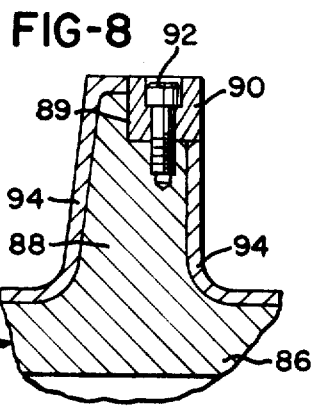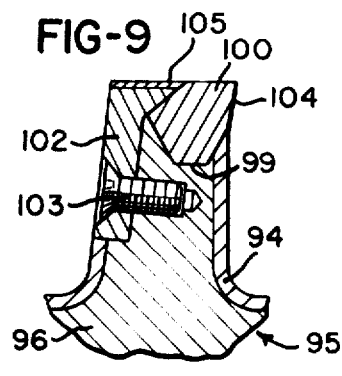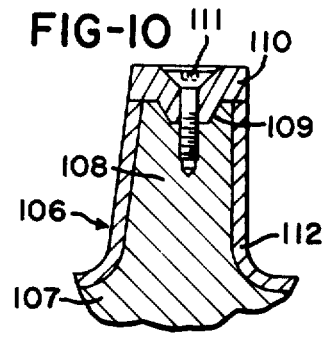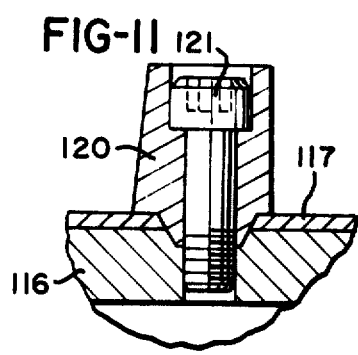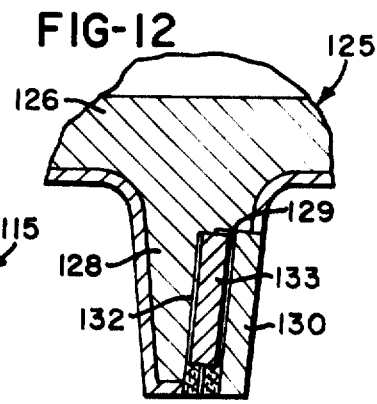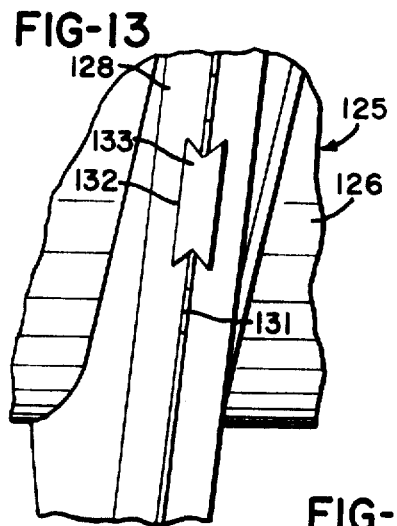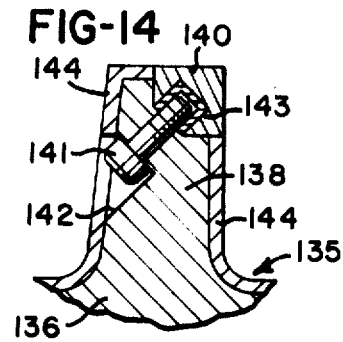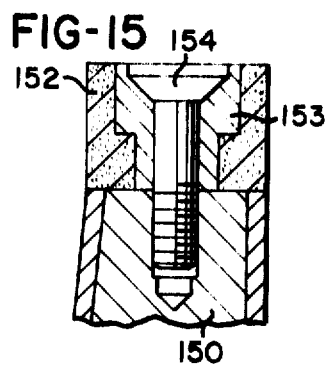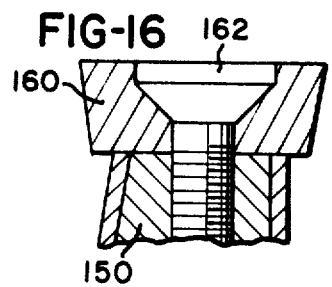

3,592,128

SCREW PRESS

BACKGROUND OF THE INVENTION

In mechanical screw presses the outer surfaces of worm flights forming the screw are often hard-coated to reduce wear on peripheral edges of the flights, where it is usually most severe. The hard-coating operation is commonly performed by welding a layer of material such as "Stellite No. 94" available from Union Carbide Corp., onto the outer surfaces of each worm flight after which the material is ground to bring each worm flight within predetermined final dimensions and provide a smooth outer surface. Frequently, after a screw press has had extensive use, even these hardened peripheral edges become worn, resulting in a significant reduction in operating efficiency. Such wear is particularly noticeable when pressing somewhat abrasive material such as sugar cane bagasse containing sand and other foreign abrasive material.

To recondition the screw, the press must be disassembled, the screw removed from the pressing chamber, the flights rebuilt and reconditioned by again welding a hard material on their peripheral edges, and then grinding the material. When the screw is reconditioned in the field, however, frequently the necessary equipment for machining and grinding a material coating as hard as the original coating is not available. In such a case, the screw flights are rebuilt by welding on a softer material, and as a result the worms are less wear resistant, and the useful service life of the reconditioned screw is reduced. Moreover, the reconditioning of the worm flights requires significant downtime of the screw press which sometimes occurs during peak operational periods.

SUMMARY OF THE INVENTION

The present invention is directed to a mechanical screw press incorporating an improved screw flight construction with substantially increased resistance to wear, thereby extending the useful service life of the original screw. In addition, the invention provides for more convenient reconditioning of the screw by eliminating the need for disassembling the screw from the pressing chamber for rebuilding.

In accordance with a preferred embodiment of the invention, the peripheral edge or forward face of a worm flight receives arcuate-shaped hardened insert members. Each hardened insert is removably secured to the worm flight by threaded fasteners, thus when it is desirable to recondition the worm flights in the field, it is only necessary to open the cage and to replace the individual hardened inserts, without removing the screw from the pressing chamber. This can be done simply by indexing the screw shaft to present each insert for convenient access to its corresponding threaded fasteners.

The hardened screw flight inserts of the invention may take various forms. For example, the inserts may be in the form of hard-coated arcuate steel plates, or hardened cast arcuate plates which are removably attached to the forward face of a screw flight by axially extending bolts or studs. The inserts may also be formed of cast arcuate ring sections which are removably attached to the periphery of a worm flight by a series of radially extending screws. In smaller worms, the inserts may take the form of arcuate flight sections which are removably secured to a cylindrical body or shaft by radially extending screws.

Other features and advantages of the invention will be apparent from the following description, the accompanying drawings and the appended claims.

BRIEF DESCRIPTION OF THE DRAWINGS

FIG. 1 is an elevational view of a screw press constructed in accordance with the invention with a portion of the cage and cover broken away to show internal construction;

FIG. 2 is a radial section of the cage alone, taken generally along the line 2-2 of FIG. 1;

FIG. 3 is an elevational view of a typical worm constructed in accordance with the invention, with one end broken away and shown in section;

FIG. 4 is an axial or end view of the worm shown in FIG. 3;

FIG. 5 is an enlarged fragmentary section taken generally on the line 5-5 of FIG. 4;

FIG. 6 shows a modification of the insert shown in FIG. 5;

FIG. 7 shows another modification of the insert illustrated in FIG. 5; and

FIGS. 8—16 shown further embodiments of a hardened screw flight insert constructed in accordance with the invention.

DESCRIPTION OF PREFERRED EMBODIMENTS

Referring to the drawings, the high-pressure mechanical screw press shown in FIG. 1 generally includes a base 10 which supports an elongated cylindrical cage 12. The cage 12 defines a circular pressing chamber 13 having an inlet end in communication with a inlet housing 14 into which material for processing is fed from the hopper 16, and an outlet end in communication with a discharge housing 18. As shown in FIG. 2, the cage 12 may be formed in two half sections 20 and 22 which are hinged together at the top by an elongated tie rod 24 extending through the ears 25. The cage sections 20 and 22 are clamped together by a series of bolts 26 which extend through the upper and lower portions of the cage sections 20 and 22. It is to be understood that the cage sections 20 and 22 may instead be pivotally supported adjacent their lower portions to provide for lowering each section after the bolts 26 are removed.

A series of axially extending screen bars 28 are mounted in parallel relationship around the internal circumference of the cage ribs 29 and are spaced apart, as by wedge-shaped spacing members (not shown), so that the screen bars 28 define therebetween narrow elongated drainage passageways. The fluid which is expressed from the material through these drainage passageways in collected in the bottom of the base 10 and is drained from the press through the conduit 31. The screen bars 28 and the spacing members are clamped within the cage sections 20 and 22 by a series of retaining bars 34 (FIG. 1).

A conveying and pressing screw 35 is rotatably mounted within the cage 12 and extends from the inlet end to the discharge end. The screw 35 includes a shaft 37 (FIG. 2) on which are mounted a series of worms 38, each of which includes a cylindrical body 39 (FIG. 3) and a projecting spiral or helical flight 40. The worms 38 are spaced apart by annular collar members 42 mounted on the shaft 37. The collar members may be tapered or cylindrical in configuration, and define gaps or interruptions between the spiral flights 40. Breaker bars 44 are either retained by or formed as an integral part of the retaining bars 34, and include lug portions which project into the gaps between the flights 40 to resist rotation of the material with the flights while the material is being compressed.

The screw 35 is driven from the feed end by an electric motor 45 through a gear reduction unit enclosed within the housing 46. By either reducing the inside diameter of the pressing chamber 13 as shown in FIG. 1 or by increasing the diameter of the body of the worms 38 and collar members 42, or by decreasing the pitch between the flights 40, the volumetric space defined between adjacent flights 40 within the chamber 13 may be reduced toward the discharge end of the press to provide the desired compression of the material being processed. In some cases sufficient compression can be obtained merely by restricting the opening at the discharge end.

Referring to FIGS. 3—5, the flight 40 of each worm 38, or of at least the final discharge worm, includes a plurality of hardened inserts 50 in the form of arcuately and helically shaped plates which form the forward face and leading peripheral edge of the flight. Preferably the inserts 50 are cast from a material which has extreme hardness, as for example, Stellite No. 1, or No. 6, available from Union Carbide Corp.

The inserts 50 seat within a recess 52 (FIG. 5) formed along the periphery of flight 40, and each insert is secured by a series of three bolts 55 having knurled heads 56 which are cast within the inserts. The bolts 55 extend through corresponding axially extending holes formed within the flight 40 and into corresponding counterbores 57 which receive nuts 58. A circular plate 59 covers each counterbore 57 and is tack-welded in place to prevent the material being processed from entering the counterbores 57.

A layer or coating 65 of hardened material, such as Stellite No. 6 may cover the remaining outer surface of the screw flight 40 and body 39. Usually, this coating is applied by a welding operation using a filler metal formed from the hardened material. The hard coating 65 is then ground to provide a smooth outer surface.

Referring to FIG. 6, instead of casting the heads 56 of the bolts 55 within the hardened cast inserts 50, each insert 50' has cast in it a series of discs 67 each having a peripheral groove 68 and a threaded hole 69. After the inserts 50' are cast, threaded studs 70 are inserted within the discs 67, and the inserts 50' are mounted and secured within the helical recess 52 in the same manner as shown in FIG. 5.

It is also within the scope of the invention to employ removable steel base inserts each having a hard coating. For example, a formed or cast steel insert 75 (FIG. 7) has a configuration similar to the insert 50, and includes a layer or coating 76 of hard material forming its forward face and outer peripheral surface. Each insert 75 has a series of threaded studs 55 which can be cast in, as with the inserts 50, or the studs can be fixed to the steel base by welding or threading into tapped holes. In addition to the hard coating 76 on each of the inserts 75, an inlaid strip 78 of tungsten carbide, preferably secured by silver solder, forms the leading peripheral edge portion of the insert.

Referring to FIG. 8 which shows another embodiment of the invention, a worm 85 has a body 86 with an outwardly projecting helical flight 88. A peripheral recess 89 is formed within the flight 88 and receives a series of arcuately shaped hardened cast inserts 90. Each insert 90 is retained by a series of radially extending bolts 92 threaded into the flight 88. While the inserts are preferably formed in arcuate sections, it is possible to form a single cast insert for each screw flight.

A hard coat facing 94 is applied to the surfaces of the screw flight 88 and body 86 in the same manner as explained above for the embodiment of FIG. 5. It is also within the scope of the invention to construct the arcuately shaped inserts 90 with a base of steel and a hard coating, forming the forward face and outer peripheral surface.

In the embodiment shown in FIG. 9, a worm 95 has a body 96 and a helical flight 98 has a generally dovetail-shaped peripheral groove or recess 99. The arcuately shaped hardened inserts 100 are retained within the recess 99 by a series of arcuately shaped clamping plates 102 and each plate 102 is secured to the worm flight 98 by axially extending socket head bolts 103. Each hardened insert 100 has a forward and outwardly extending surface 104 which forms the leading peripheral edge of the worm flight 98, and a coating 105 of hardened material forms the outer peripheral surface of each clamping plate 102. The forwardly extending surface 104 has been found desirable to increase the area of the peripheral surface and thereby provide a longer service life.

Referring to FIG. 10 which shows another embodiment of the invention, a worm 106 has a body 107 and a helical flight 108 with a dovetail groove 109 formed in its outer peripheral surface. A series of arcuately shaped caplike hardened cast inserts 110 are mounted within the groove 109 and form the entire peripheral surface of the flight 108. Each insert 110 is retained by a series of radially extending socket head bolts 111. Similar to the previously described embodiments, a hardened coating 112 is provided on the forward and rear faces of the worm flight 108 and on the body 107.

On some worms where the radial dimension of a screw flight is relatively small, it is possible to cast the entire worm flight from a hardened material and removably attach the flight to the body. For example, as shown in FIG. 11, a worm 115 has a cylindrical body 116 with a hardened coating 117 forming its outer surface. A spiral or helical groove 118 is formed within the body 116 and a hardened cast insert flight 120 is mounted on the body 116 interfitting within the groove 118. Preferably, the flight 120 is constructed in arcuate sections, in the same general manner as the flight insert members shown in the previous embodiments, and the adjoining end surfaces (not shown) of the screw flight sections have interfitting dovetail portions (not shown). Each arcuate section of the flight 120 is secured to the cylindrical body 116 by a series of radially extending screws 121.

Referring to FIGS. 12 and 13 showing another embodiment of the invention, a worm 125 includes a body 126 and a spiral or helical flight 128. A recess 129 is formed within the forward leading face of the flight 128, in a manner similar to the recess 52 (FIG. 5) formed within the flight 40, for receiving arcuately shaped and helical platelike hardened insert members 130. A plurality of thin spacers 131 are positioned within the recess 139 adjacent the back surface of each insert member 130, and opposing dovetail grooves 132 (FIG. 13) are formed within the back surface of the inserts and the recess 129 for receiving corresponding shaped radially extending retaining blocks 133. The gap defined between the inserts 130 and the inner surface of the recess 129 is filled with a suitable metal such as silver solder to provide a solid backing for the relatively brittle hardened inserts 130.

Another embodiment of the invention is shown in FIG. 14. In this embodiment, a worm body 136 supports a helical flight 138 which has a peripheral recess 139 similar to the recess 89 shown in the embodiment of FIG. 8. A series of arcuately shaped hardened cast insert members 140 are mounted within the recess 139, and each insert is retained by a series of bolts 141 extending forwardly and outwardly from corresponding pockets 142 formed within the back surface of the flights 138 and threaded into steel inserts 143 cast within the inserts 140. A hard coat 144 of "Stellite No. 1" or other suitable material is deposited on the remaining surface of the worm flight 138 and body 136, and preferably each bolt 141 is tack-welded to assure that it does not loosen during operation of the press.

FIG. 15 shows a modification of the embodiment shown in FIG. 10. Instead of the peripherally extending dovetail groove 109, worm flight 150 has a series of arcuately shaped hardened cast insert members 152 which form the entire outer peripheral edge portion of the flight. Each hardened insert member 152 has cast into it a series of shouldered steel inserts 153 for receiving corresponding radially extending bolts 154 which are threaded into the base portion of the flight 150.

A modification of the embodiment shown in FIG. 15 is shown in FIG. 16, wherein a series of arcuately shaped hardened cast insert members 160 form the outer peripheral portion of the flight and are each secured by a plurality of radially extending bolts 162. In contrast to the inserts 110 (FIG. 10) and the inserts 152 (FIG. 15), the inserts 160 project axially from the front and rear surface of the remaining portions of the helical flight 150 to provide a greater peripheral width and thereby provide a greater peripheral wear surface.

It is clear form the drawings and the above description that a mechanical screw press having a worm flight constructed in accordance with the invention provides several desirable features and advantages. For example, by providing each worm flight with either a single or a series of hardened removable cast inserts, the peripheral portion of the flight is provided with a hardness which is even greater than the welded hard-coating on the worm body and the remaining portion of the flight, so the screw is provided with improved wear resistance along the peripheral surface of the flights where wear is most severe. Moreover, after the screw press has had extensive use and it is desirable to recondition the screw, the hardened inserts can be conveniently replaced in the field without requiring the removal of the entire screw from the press and the removal of each worm from the shaft 37.

Therefore, a screw can be reconditioned at a substantially lower cost and in substantially shorter time which reduces the downtime of the press. Furthermore, by replacing the hardened cast inserts on the flights the screw can be rebuilt to essentially the same condition as the original, and the service life of a reconditioned screw is substantially the same as the original screw. When the hardened cast inserts are replaced in the field, no subsequent grinding operation is needed, and the press is quickly returned to service.

While the forms of apparatus herein described constitute preferred embodiments of the invention, it is to be understood that the invention is not limited to these precise forms of apparatus, and that changes may be made therein without departing from the scope of the invention which is defined in the appended claims.

What I claim is:

1. In a mechanical screw press having a cage forming an elongated cylindrical pressing chamber with an inlet end and a discharge end, a rotatable screw extending through said chamber and including a plurality of axially disposed worms each having an outwardly projecting integral helical flight, each said flight having a generally radially extending helical forward face, means cooperating with said flights for compressing material as it moves through said chamber toward said discharge end in response to rotation of said screw, and breaker-bar means including portions projecting from said cage into said chamber between said flights to resist rotation of the material with said flights; the improvement comprising means defining an arcuate cavity within said forward face of at least one of said flights and extending radially outwardly to the outer periphery of said flight, a separate arcuate hardened insert member recessed within said cavity and projecting outwardly to said outer periphery of said flight, the depth of said cavity corresponding substantially to the thickness of said insert member causing the forward surface of said insert member to be substantially flush with said face, and means for releasably securing said insert member within said cavity.

2. A screw press as defined in claim 1 including a plurality of said arcuate insert members disposed within said cavity in end-to-end abutting relation.

3. A screw press as defined in claim 1 wherein said means for releasably securing said insert member within said cavity, comprises at least one radially extending interlocking wedge.

4. A screw press as defined in claim 1 including a coating of hard material forming the outer surface of said flight surrounding said insert member.

5. A screw press as defined in claim 1 including means forming a plurality of threaded holes within said insert member, and a corresponding plurality of bolts extending through said one flight and into said holes.

6. A screw press as defined in claim 1 wherein said securing means comprises clamping means mounted on the rear face of said flight, and threaded fastener means securing said clamping means to said flight.

7. A screw press as defined in claim 6 wherein said clamping means comprises a plurality of arcuately shaped clamping plates mounted on said rear face of said one flight.

8. A screw press as defined in claim 1 wherein said insert member comprises a relatively softer metal base portion, and a coating of hard material on said base portion arranged to form the forward peripheral surface of said one flight.

9. A screw press as defined in claim 1 wherein said insert member includes an inlaid strip forming at least a portion of the peripheral leading edge portion of said one flight, said strip having a hardness substantially greater than the hardness of the remaining portion of said insert member.

10. A screw press as defined in claim 9 wherein said inlaid strip is formed of tungsten carbide.

11. A screw press as defined in claim 1 wherein said securing means comprise at least one threaded fastener cast integrally to said insert member.

12. A screw press as defined in claim 1 wherein said insert member forms a portion of said one flight, rigid spacer means between said insert member and the other portion of said flight, and filler means between said insert member and said other portion of said flight to minimize tension forces within said insert member.